United States Patent [19]
McKibben et al.

[11] Patent Number: 5,956,390
[45] Date of Patent: Sep. 21, 1999

[54] METHOD AND APPARATUS FOR PROVIDING VERIFIED MESSAGE RECEIPT IN A MESSAGING SYSTEM

[75] Inventors: Bernard R. McKibben, Gilbert; Pramodkumar Patel, Phoenix; William Read Bassing, Chandler, all of Ariz.

[73] Assignee: Motorola, Inc., Schaumburg, Ill.

[21] Appl. No.: 08/927,142

[22] Filed: Sep. 3, 1997

[51] Int. Cl.⁶ .................................................. H04M 11/00
[52] U.S. Cl. .............................. 379/93.07; 379/100.06; 358/400; 358/407
[58] Field of Search .................. 379/93.01, 93.06–93.08, 379/93.14, 93.15, 93.17, 93.24–93.28, 100.01, 100.03, 100.06–100.15, 67.1, 84, 88.12, 88.22–88.25, 201, 213, 214; 358/400–404, 407, 434–440, 442, 468

[56] References Cited

U.S. PATENT DOCUMENTS 5,404,231  4/1995  Bloomfield .............................. 358/400

FOREIGN PATENT DOCUMENTS 2155606   2/1996   Canada ................................ 379/93.07
9642163  12/1996   WIPO .............................. H04M 3/50
9813989   4/1998   WIPO .............................. H04M 3/22

*Primary Examiner*—Wing F. Chan
*Attorney, Agent, or Firm*—Frank J. Bogacz; Dana B. LeMoine

[57] ABSTRACT

A method and apparatus for providing a verified message receipt in a messaging system (10) notifies users (30) when messaging system subscribers (40) retrieve messages (370). Verified message receipts can take the form of pages, faxes, automated call-backs or additional messages. In operation, when a user (30) leaves a message (370) for a messaging system subscriber (40), a verified message receipt flag (375) is raised and a user pager number (380) or user fax number (390), or user telephone number (395) is entered. A message origination and delivery device (20) includes many message boxes (300) for many subscribers (40). The message origination and delivery device (20) generates verified message receipts when subscribers (40) retrieve messages (370).

19 Claims, 6 Drawing Sheets

FIG. 3

| SUBSCRIBER DIRECTORY NUMBER | SURVEILLANCE FLAG | SURVEILLANCE USER PAGER NUMBER | SURVEILLANCE USER FAX NUMBER | SURVEILLANCE USER TELEPHONE NUMBER |
|---|---|---|---|---|
| 320 | 330 | 340 | 350 | 355 |

| MESSAGE ID | MESSAGE | MESSAGE RECEIPT FLAG | USER PAGER NUMBER | USER FAX NUMBER | USER TELEPHONE NUMBER |
|---|---|---|---|---|---|
| 365 | 370 | 375 | 380 | 390 | 395 |
| MESSAGE ID | MESSAGE | MESSAGE RECEIPT FLAG | USER PAGER NUMBER | USER FAX NUMBER | USER TELEPHONE NUMBER |
| MESSAGE ID | MESSAGE | MESSAGE RECEIPT FLAG | USER PAGER NUMBER | USER FAX NUMBER | USER TELEPHONE NUMBER |
| ... | ... | ... | ... | ... | ... |
| MESSAGE ID | MESSAGE | MESSAGE RECEIPT FLAG | USER PAGER NUMBER | USER FAX NUMBER | USER TELEPHONE NUMBER |

360

METHOD AND APPARATUS FOR PROVIDING VERIFIED MESSAGE RECEIPT IN A MESSAGING SYSTEM

FIELD OF THE INVENTION

This invention relates in general to messaging systems and, in particular, to the verification of receipt of messages.

BACKGROUND OF THE INVENTION

In messaging systems, messages are deposited by users of the system for later delivery to subscribers of the messaging service. Example messaging systems include data messaging systems and voice messaging systems.

Messaging systems currently known in the art lack a mechanism for alerting users, such as private parties or surveillance users, of the system when a message has been retrieved. As a result, when a user is interested in the receipt of a message, or of multiple messages, the user is left wondering not only what, if any, messages have been retrieved, but also at what time they were retrieved. Further, existing messaging systems provide no real-time indication to users that a subscriber has actually retrieved a deposited message.

In prior art systems, a surveillance user, usually a law enforcement agency, obtains a message box which receives duplicate messages of the parties under surveillance. Whenever the party under surveillance receives a message, the duplicate message box assigned to the surveillance user also receives the message. It is important that the surveillance user receive an indication of which message residing in the subscriber's message box has been retrieved, although this is not provided in prior art systems.

What is needed is a method and apparatus for alerting a user in real-time that a subscriber has retrieved a message, where the alert includes information as to which message has been retrieved and at what time it was retrieved.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 3 shows a diagram of a user data structure included in a message box in accordance with a preferred embodiment of the present invention;

FIG. 4 shows a diagram of a message data structure included in a message box in accordance with a preferred embodiment of the present invention;

DETAILED DESCRIPTION OF THE DRAWINGS

Figure 1:
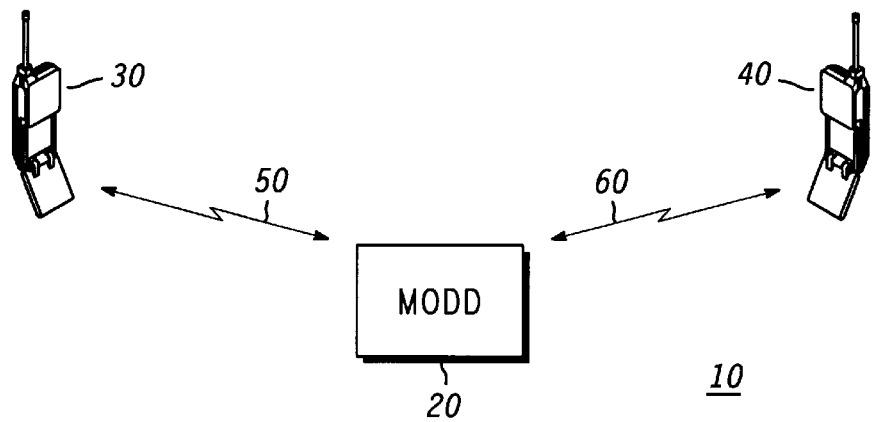
FIG. 1 shows a diagram of a messaging system in accordance with a preferred embodiment of the present invention.

Turning now to the drawings in which like reference characters indicate corresponding elements throughout the several views, attention is first directed to FIG. 1.

FIG. 1 shows a diagram of a messaging system in accordance with a preferred embodiment of the present invention. Messaging system 10 includes message origination and delivery device (MODD) 20, user 30, subscriber 40, user link 50, and subscriber link 60. Subscriber 40, in the context of messaging system 10, has subscribed to the services of communication system 10, some of which services are provided by MODD 20. Subscriber 40 communicates with MODD 20 via subscriber link 60.

Subscriber link 60 is a link or collection of links between subscriber 40 and MODD 20 which supports a multitude of communication types. Examples include, but are not limited to, digital data and voice. In addition, subscriber link 60 can be a link utilizing spectrum in the atmosphere, such as a satellite link or a cellular telephone link, or alternately, subscriber link 60 can be a link established terrestrially through the public switched telephone network (PSTN). While FIG. 1 shows a single subscriber 40, a preferred embodiment of the present invention supports any number of subscribers 40.

MODD 20 provides services for subscriber 40. One such service provided by MODD 20 is the storage and forwarding of messages. During operation of communication system 10, if subscriber 40 is unavailable when a user, or caller, wishes to contact the subscriber, then a message can be left with MODD 20 for later retrieval by subscriber 40. User 30 is any entity attempting to communicate with subscriber 40. User 30 can be a data terminal or a telephone operated by a human, or alternately, user 30 can be a computer. User 30 communicates with communications system 10 via user link 50.

User link 50 is a link or collection of links between user 30 and MODD 20 which supports a multitude of communication types. Examples include, but are not limited to, digital data and voice. In addition, user link 50 can be a link utilizing spectrum in the atmosphere, such as a satellite link or a cellular telephone link, or alternately, user link 50 can be a link established terrestrially through the public switched telephone network (PSTN).

In operation, when user 30 attempts to communicate with subscriber 40 and subscriber 40 is unavailable, or when user 30 desires to leave a message directly for subscriber 40, a communications session is set up between user 30 and MODD 20 via user link 50. This session represents a service made available to messaging system subscriber 40. As a result of this session, MODD 20 stores a message from user 30. This message can include digital data, voice, or a combination of the two. At a later time, when subscriber 40 retrieves the message from MODD 20, MODD 20 notifies user 30 that the message has been retrieved.

In addition to leaving a message when a subscriber is unavailable, a preferred embodiment of the present invention allows users to leave messages directly with MODD 20 without attempting direct communications with subscriber 40. In the case of a voice messaging system, a user would simply call the messaging system, specify the subscriber which a message is intended for, and then leave a message. Again, at a later time, when subscriber 40 retrieves the message from MODD 20, MODD 20 notifies user 30 that the message has been retrieved.

When user 30 is notified by MODD 20 that subscriber 40 has retrieved the message, user 30 has received a verified message receipt and is termed a verified message receipt user. Although FIG. 1 shows a single user 30, in a preferred embodiment, communications system 10 supports multiple users 30. There is no restriction that the user 30 which left the message for subscriber 40 is the same user 30 which receives the verified message receipt. Further, there is no limitation that the device, or type of device, that was used to deposit the message is the same as that that receives the verified message receipt. For instance, a voice message can be left by a first user, and the verified message receipt can be received via fax or page by a second user.

The verified message receipt can take many forms. Possibilities include, among others, pages (alphanumeric), automated telephone callbacks (voice), and facsimiles (faxes). When a verified message receipt is by page, and MODD 20 generates the verified message receipt, a page is sent to the user to notify the user of the receipt of the message by the subscriber. The page received by user 30 preferably includes information specifying the subscriber that retrieved the message, a message identifier, the time of retrieval, and as an option, when the message format is compatible, a portion or all of the message contents. When the message format is not compatible and a user wants a complete copy of an original message included with a verified message receipt, a user can subscribe to the messaging system, and have verified message receipts left as messages in a message box. In operation, when a user (which is now also a subscriber) receives a verified message receipt by page, that user can contact the messaging system and retrieve a complete copy of the original message, along with subscriber information and time of retrieval.

When a verified message receipt takes the form of a fax, then MODD 20 sends a fax to a user when a subscriber retrieves a message. The fax preferably includes information specifying the subscriber that retrieved the message, a message identifier, the time of retrieval, and as an option, when the message format is compatible, a portion or all of the message contents. When the message format is not compatible and a user wants a complete copy of an original message included with a verified message receipt, a user can subscribe to the messaging system, and have verified message receipts left as messages in a message box. In operation, when a user (which is now also a subscriber) receives a verified message receipt by fax, that user can contact the messaging system and retrieve a complete copy of the original message, along with subscriber information and time of retrieval.

When a verified message receipt takes the form of a telephone callback, then MODD 20 makes a phone call to a user when a subscriber retrieves a message. The phone call preferably includes information specifying the subscriber that retrieved the message, a message identifier, the time of retrieval, and when the message format is compatible, a portion or all of the message contents. When the message format is not compatible and a user wants a complete copy of an original message included with a verified message receipt, a user can subscribe to the messaging system, and have verified message receipts left as messages in a message box. In operation, when a user (which is now also a subscriber) receives a verified message receipt by telephone callback, that user can contact the messaging system and retrieve a complete copy of the original message, along with subscriber information and time of retrieval.

There is no requirement that the verified message receipt in the form of a page, fax, or telephone callback is sent to, or retrieved by, the user that left the message. As will be shown below, any fax number, page number, or telephone number can be left with MODD 20 during the process of depositing a message with MODD 20. In addition, there are cases where, as with law enforcement agencies performing surveillance of subscribers, a single pager or single fax machine receives verified message receipts corresponding to a potentially large number of subscribers.

The method and apparatus of the present invention provides significant advantages. User 30, in receiving a verified message receipt, is able to determine when subscriber 40 has retrieved a message, and can then take affirmative action with the knowledge that subscriber 40 has the information included in the message.

Significant advantages are also provided to surveillance users. Because surveillance users, usually law enforcement agencies, generally monitor multiple subscribers at once, manual checking of a messaging system for receipt of messages is undesirable and inefficient. The verified message receipt of the present invention frees surveillance users of the necessity of manually checking for receipt of messages by users, thereby allowing the surveillance users to spend their time more productively. Further, because many subscribers are generally monitored at once, surveillance users benefit from the additional information provided in the verified message receipt of the present invention. The verified message receipt can include a significant amount of information regarding the subscriber, the time of retrieval, and the contents of the message. This additional information included in the verified message receipt is very advantageous because it relieves the user from the duty of contacting the messaging system after receiving the verified message receipt.

Figure 2:
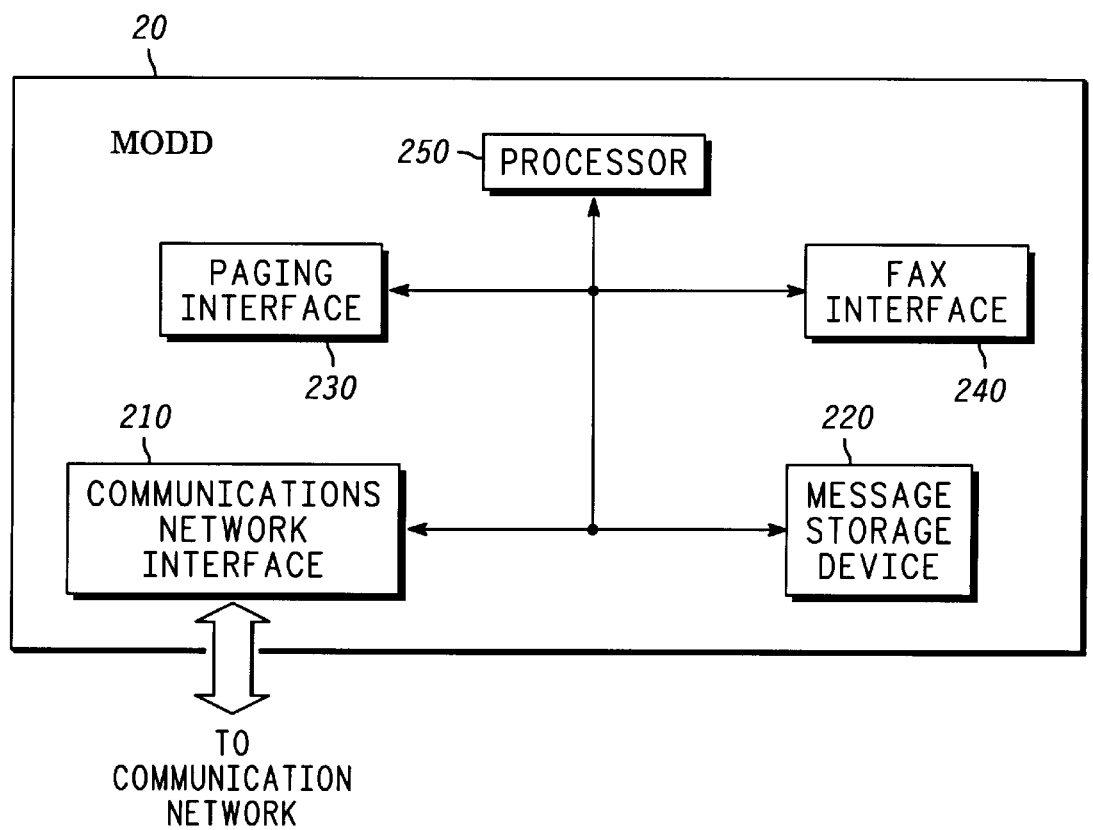
FIG. 2 shows a diagram of a message origination and delivery device in accordance with a preferred embodiment of the present invention.

FIG. 2 shows a diagram of a message origination and delivery device in accordance with a preferred embodiment of the present invention. MODD 20 includes message storage device 220, paging interface 230, fax interface 240, processor 250, and communications network interface 210. MODD 20 supports communications with user 30 (FIG. 1), and subscriber 40 (FIG. 1), through communications network interface 210. When users communicate with subscribers successfully, and do not attempt to leave messages directly, there may be no communications with MODD 20. However, when users are unable to communicate directly with subscribers and are forwarded to the MODD as a service to the messaging subscriber, or when they desire to leave a message directly, they are able to leave a message which is stored in message storage device 220. When a subscriber accesses MODD 20 for the purpose of retrieving a message, the subscriber interfaces with communications network interface 210 to retrieve the message which is stored in message storage device 220. If the verified message receipt feature is enabled, the details of which will be discussed subsequently, then a user is notified by MODD 20 through the use of paging interface 230, fax interface 240 or other suitable means. Other means for notifying a user include additional dedicated interfaces and communications network interface 210.

When a verified message receipt is being generated, a portion of, or all of, the contents of the message and/or a message ID as stored in message storage device 220 are copied to paging interface 230 or fax interface 240 by processor 250. In the case of a data messaging system, all of the message is generally copied to the fax interface, while a portion is generally copied to the paging interface. Enough information from message storage device 220 is included in the verified message receipt so that a user can tell that a subscriber has received a message, and further, which message was received and when.

The user can receive a verified message receipt via a call back from MODD 20 to the user's telephone. An automated voice message form of the verified message receipt including identification of the messaging subscriber, time of message retrieval and the retrieved message content and/or a message ID is delivered to the user telephone number.

Likewise, the user can receive a verified message receipt via a fax or page. Identification of the messaging subscriber, time of message retrieval and the retrieved message content and/or a message ID is delivered to the user's fax and/or pager number.

To complement the automatic delivery of verified message receipts via telephone, fax and/or pager, verified message receipts can also be copied to a user's mailbox within the MODD if the private or surveillance user is also a subscriber to the MODD. This allows the private or surveillance user to later retrieve the full deposited message content of the verified message receipt from the MODD should the message content format be incompatible with the notification delivery. For example, if a private or surveillance user receives a verified message receipt of a deposited fax message by page that includes a message ID but no deposited message content, the private or surveillance user can later retrieve the full fax message content using the message ID from the MODD using a compatible message receiver device.

Furthermore, all verified message receipts may be copied and temporarily stored in a central space within the MODD's message storage device so that users who are not messaging subscribers can retrieve the full message content of verified message receipts through a common MODD assigned fax, pager, or phone number for a specified period of time. These users can retrieve the full message content by using the message ID for identification.

Although MODD 20 as embodied in FIG. 2 shows a single paging interface 230 and a single fax interface 240, in a preferred embodiment multiple paging interfaces and fax interfaces exist. In addition, other types of interfaces which support different methods of providing verified message receipt are possible.

Each messaging system subscriber which subscribes to the verified message receipt feature, has a message box included within message storage device 220. When a user leaves a message for a subscriber, the message is deposited within message storage device 220 at the location of the message box belonging to the subscriber. Any number of messages can be left for a subscriber by any number of users within the boundaries of the subscribed to services and features.

FIG. 3 shows a diagram of a user data structure included in a message box in accordance with a preferred embodiment of the present invention. Subscriber data structure 310 preferably includes subscriber directory number 320 and a number of surveillance fields. The surveillance fields include surveillance flag 330, surveillance user pager number 340, surveillance user fax number 350, and surveillance user telephone number 355. Subscriber directory number 320 is a number unique to the subscriber which has been assigned to this message box.

Surveillance flag 330 is utilized when a surveillance user is to receive a verified message receipt whenever a message is retrieved from this subscriber's message box, regardless of who deposited the message. The use of surveillance flag 330 is advantageous when a third party user (a surveillance user) desires to receive a verified message receipt each time a message is retrieved by a particular subscriber. One example of the advantageous use of surveillance flag 330, is in the case of law enforcement. When a law enforcement agency is tracking the messages left for a subscriber, the use of surveillance flag 330 allows the law enforcement agency to receive a verified message receipt each time the subscriber retrieves a message.

Surveillance user pager number 340, surveillance user fax number 350, and surveillance user telephone number 355 correspond to the user, such as a law enforcement agency, which will receive verified message receipts for each message as a result of the use of surveillance flag 330. Subscriber data structure 310 shows a single surveillance flag 330, surveillance user pager number 340, surveillance user fax number 350, and surveillance user telephone number 355; however, multiples of the aforementioned surveillance fields can be maintained in subscriber data structure 310. Through the use of multiple surveillance fields, any number of surveillance users can be supported by a particular subscriber's message box.

When a surveillance user wishes to monitor the activity of a messaging system subscriber, surveillance flag 330 is raised and the corresponding surveillance user pager number, surveillance user fax number, or surveillance user telephone number, in any combination, are entered. If multiple surveillance users exist for any given messaging system subscriber, then subscriber data structure 310 will include multiple surveillance fields, and multiple surveillance flags will be raised.

FIG. 4 shows a diagram of a message data structure included in a message box in accordance with a preferred embodiment of the present invention. Any number of messages records 360 can exist within a subscriber's message box. Message record 360 includes message identification (ID) 365, message 370, message receipt flag 375, user pager number 380, user fax number 390, and user telephone number 395. Each time a message is left in a subscriber's message box, a message record 360 is created. The contents of the message are stored in message 370, and if verified message receipt is enabled, then message receipt flag 375 is raised. When message receipt flag 375 is raised, one or more of user pager number 380, user fax number 390, and user telephone number 395 are entered. When a messaging system subscriber retrieves a message by accessing a particular message record 360, if the message receipt flag 375 is raised, then a verified message receipt is sent to user pager number 380, user fax number 390, and user telephone number 395, as appropriate. As previously stated, the page, fax, or telephone callback preferably includes information related to the subscriber, the time of retrieval, and the message contents.

Figure 5:
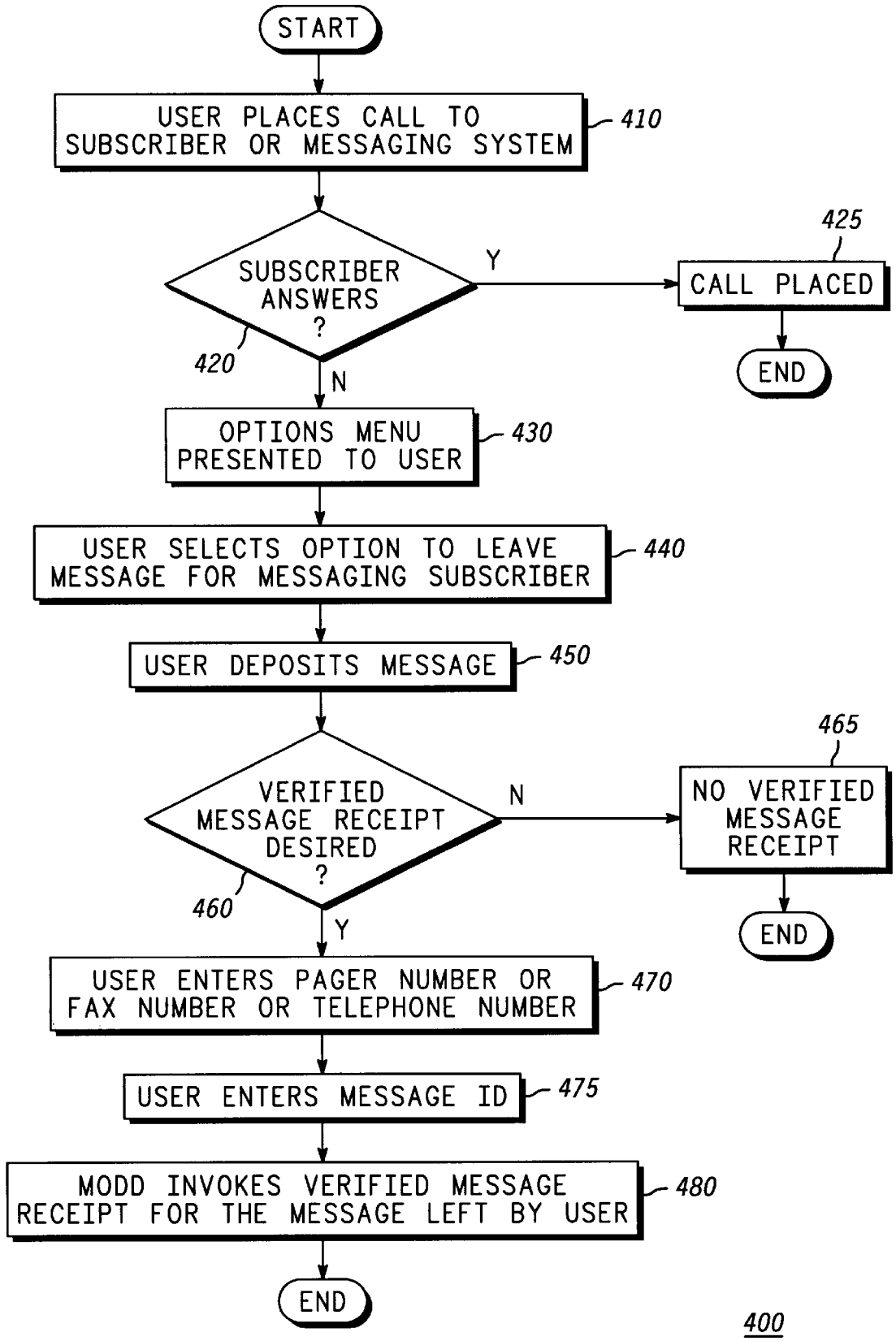
FIG. 5 shows a flow chart for a method of operating a message origination and delivery device in accordance with a preferred embodiment of the present invention.

FIG. 5 shows a flowchart for a method of operating a message origination and delivery device in accordance with a preferred embodiment of the present invention. Method 400 as embodied by FIG. 5 illustrates the interaction between a user and a message origination and delivery device in a voice messaging system, although the process can be applied to other forms of messaging, such as fax and other data connections. In step 410 a user places a call to a subscriber of the messaging system. In step 420 the message origination and delivery device determines whether the subscriber has answered the call. Step 420 can also be performed by another telecommunications device. In this case, the user's call is forward to the MODD from the telecommunications device. If the subscriber has answered the call, then processing proceeds to step 425 and the call is placed. When the call is placed in step 425 the involvement of the message origination and delivery device is complete and so after step 425, method 400 ends.

On the other hand, if in step 420, the message origination and delivery device or another communications device determines that the subscriber is not available or has their calls directed to the MODD, processing proceeds to step 430. It should be noted that in the case where the user places a call directly to the messaging system, method 400 always proceeds through step 420 to step 430. In step 430 message origination and delivery device presents a menu of options to the user. One of the options is a message option. By selecting the message option, a user can leave a message for the messaging system subscriber.

After the user selects the option to leave a message for the messaging system subscriber in step 440, the MODD accepts a message from the user in step 450. When the user deposits a message in step 450, a new message record 360 (FIG. 4) is created in the subscribers message box.

In step 460, the message origination and delivery device, preferably again through the use of a menu, determines whether the user desires a verified message receipt. If, as a result of step 460, verified message receipt is not desired, then processing proceeds to step 465. In step 465, no verified message receipt is generated. This corresponds to the message receipt flag 375 (FIG. 4) not being raised. After step 465, method 400 ends.

When, as a result of step 460, verified message receipt is desired, processing proceeds to step 470. In step 470 the user that placed the call enters a pager number, a telephone number, a fax number, or any combination of these. If the user enters a pager number, it is placed in user pager number 380 (FIG. 4), and if the user enters a fax number, it is entered in user fax number 390 (FIG. 4). Further, if the user enters a telephone number, it is entered into user telephone number 395 (FIG. 4). After step 470, processing proceeds to step 475 where the MODD accepts a message ID from the user. If the user opts to input the message ID, it is stored in message ID 365 (FIG. 4). The value of the message ID can be assigned by the MODD, but it is preferably accepted from the user so that when the verified message receipt is generated including the message ID, the user will easily recognize the message that was retrieved without the need to listen to the message contents.

As a result of the steps thus far encountered in method 400, a message record 360 (FIG. 4) has been generated. Lastly, in step 480, the MODD invokes the verified message receipt feature for the message left by the user. This is accomplished by raising message receipt flag 375 (FIG. 4).

In the case of a data messaging system, the correct user input such as the phone, fax, and pager numbers, and message ID can be embedded in the format of the data message itself. This user input data can then be transferred from the input message format to the data structures as shown in FIG. 3 and FIG. 4.

A surveillance user uses a similar process as that of process 400 as shown in FIG. 5, except the surveillance user requests verified message receipts based upon message subscriber identification and not individual deposited messages as in the case of the private user. This is because a surveillance user typically likes to receive all messages deposited for a messaging subscriber. Like the private user, the surveillance user enters information which includes pager, fax and/or telephone numbers specifying destinations for the verified message receipts.

Figure 6:
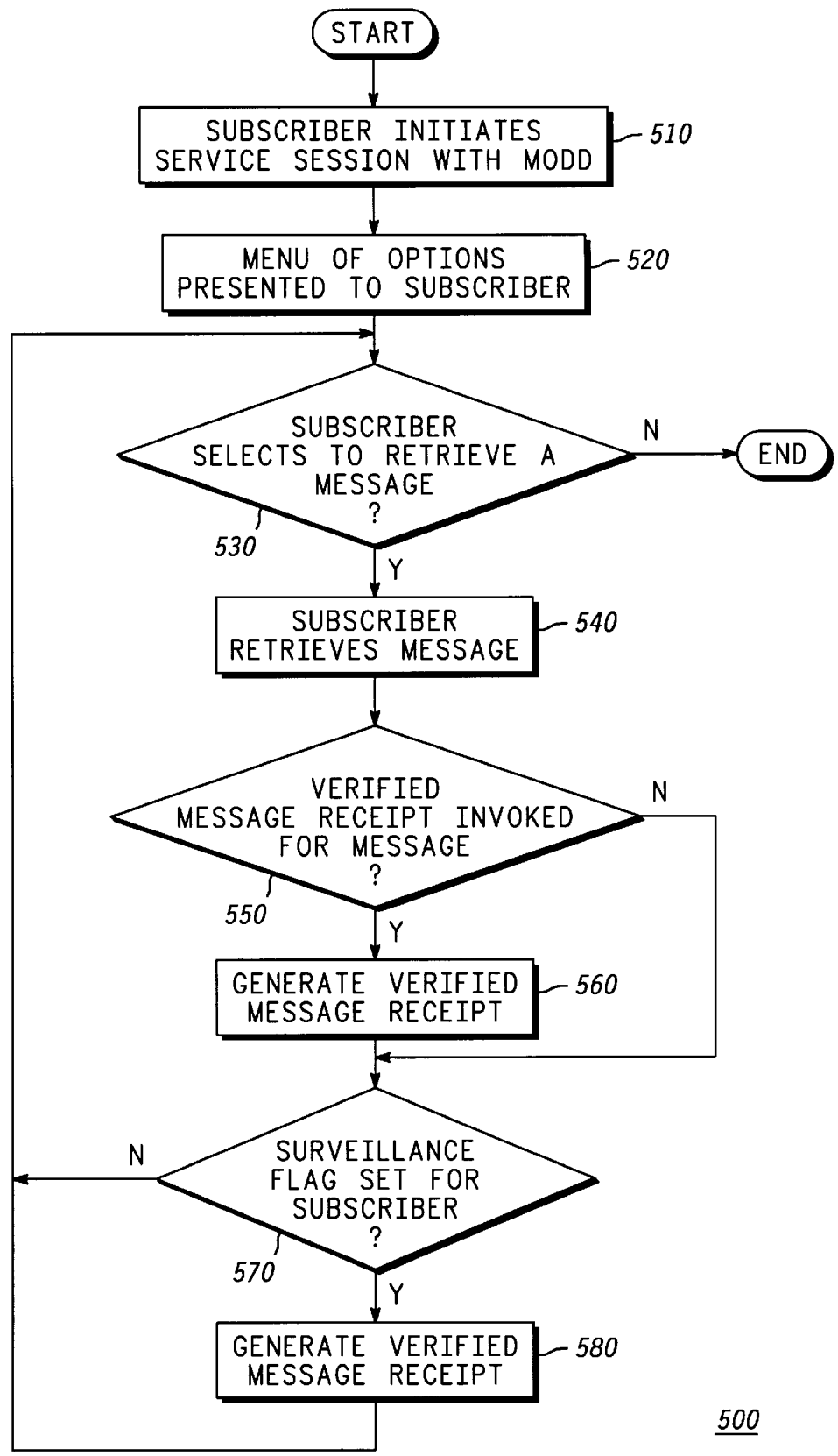
FIG. 6 shows a flow chart for a method of operating a message origination and delivery device in accordance with a preferred embodiment of the present invention.

FIG. 6 shows a flowchart for a method of operating a message origination and delivery device in accordance with a preferred embodiment of the present invention. Method 500 shows the interaction between a messaging system subscriber and the message origination and delivery device when the subscriber initiates communications for the purpose of retrieving messages. In step 510, the subscriber initiates a service session with the message origination and delivery device. This service session is preferably accomplished through a voice link, alphanumeric telephone link or other data link. After the subscriber has initiated the service session in step 510, the message origination and delivery device presents a menu of options to the subscriber in step 520. One option presented to the subscriber is the option to retrieve a message. If, in step 530, the message origination and delivery device determines that the subscriber has selected to retrieve a message, then processing proceeds to step 540; otherwise method 500 terminates.

In step 540 the subscriber retrieves the message. In a data messaging system, this would entail the subscriber reading or receiving a message. In a voice messaging system, this would entail the subscriber listening to the message along with user information and time information. After the message origination and delivery device has given the message to the subscriber in step 540, the message origination and delivery device checks to see if verified message receipt was invoked for the message in step 550. If verified message receipt was invoked, processing continues with step 560. On the other hand, if verified message receipt was not invoked for the message, step 560 is passed and processing proceeds with step 570.

In step 560 a verified message receipt is generated. After the verified message receipt is generated in step 560, processing continues with step 570. In step 570 the message origination and delivery device checks if any surveillance flags are raised for the subscriber. If surveillance flags are raised for the subscriber, then verified message receipts are generated for the surveillance users in step 580. Otherwise, processing returns to step 530 where the subscriber is allowed to retrieve additional messages. The larger loop in method 500 continues until a subscriber either selects to not retrieve an existing message in step 530, or all messages have been retrieved by the subscriber.

Figure 7:
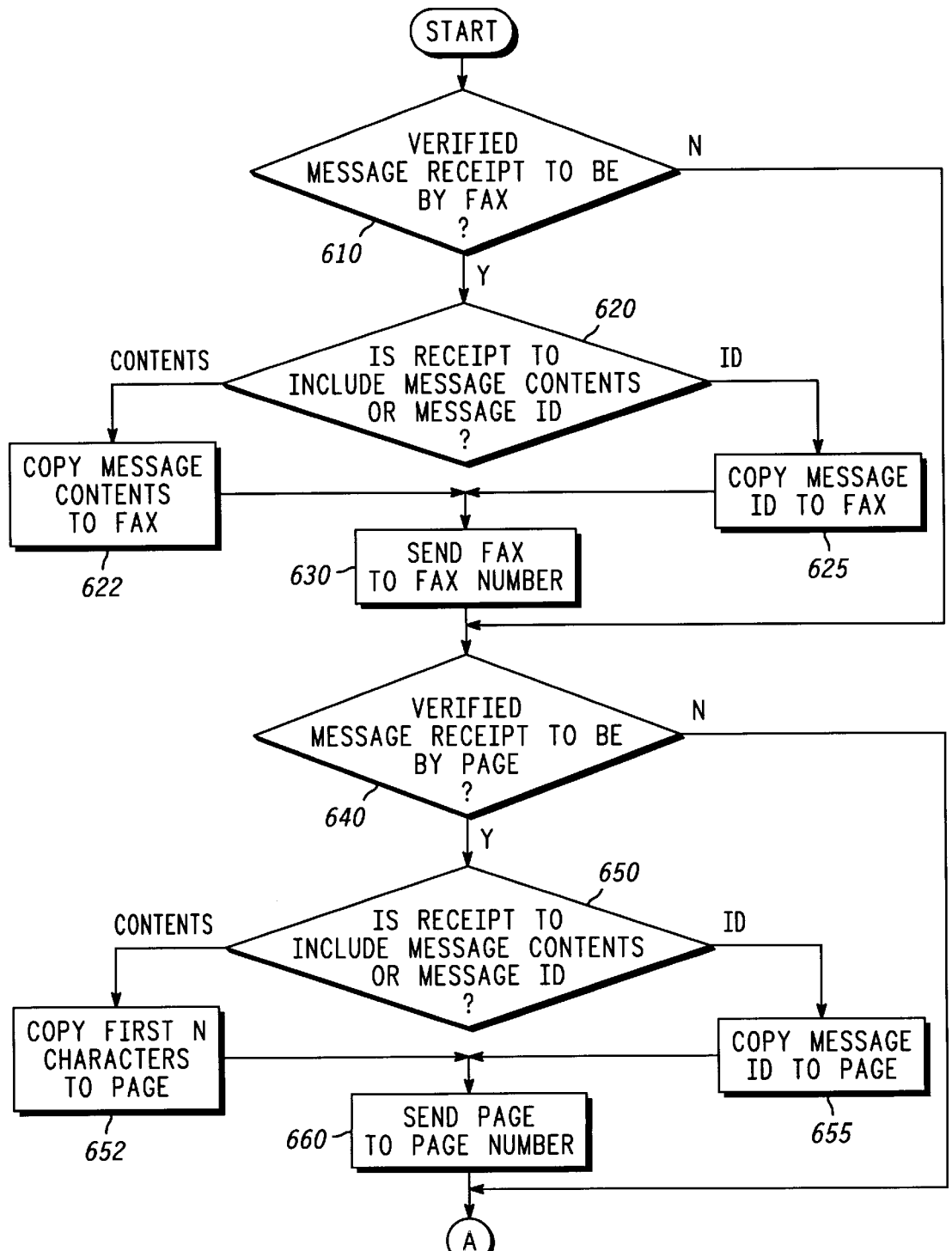
FIG. 7 shows a flow chart for a method of generating a verified message receipt in accordance with a preferred embodiment of the present invention.

FIG. 7 shows a flowchart for a method of generating a verified message receipt in accordance with a preferred embodiment of the present invention. Method 600 is applicable to all cases where a verified message receipt is generated, including for surveillance users, and for non-surveillance users. Method 600 as shown in FIG. 7 starts at step 610 where the message origination and delivery device checks to see if a verified message receipt is to be delivered by fax. If a verified message receipt is not to be delivered by fax, as evidenced by the lack of a non-surveillance or surveillance user fax number, then processing proceeds to step 640. If, on the other hand, verified message receipt is to be delivered by fax, processing proceeds to step 620. In step 620 the MODD determines whether all or a portion of the message contents, or the message ID are to be included in the verified message receipt. If all or a portion of the message is to be included, then processing continues with step 622, where message contents are copied to the fax interface. If the message ID is to be included in the verified message receipt, then processing continues with step 625 where the message ID is copied to the fax interface. Then, after either step 622 or step 625, processing proceeds to step 630 where the verified message receipt is sent to the fax number.

Figure 8:
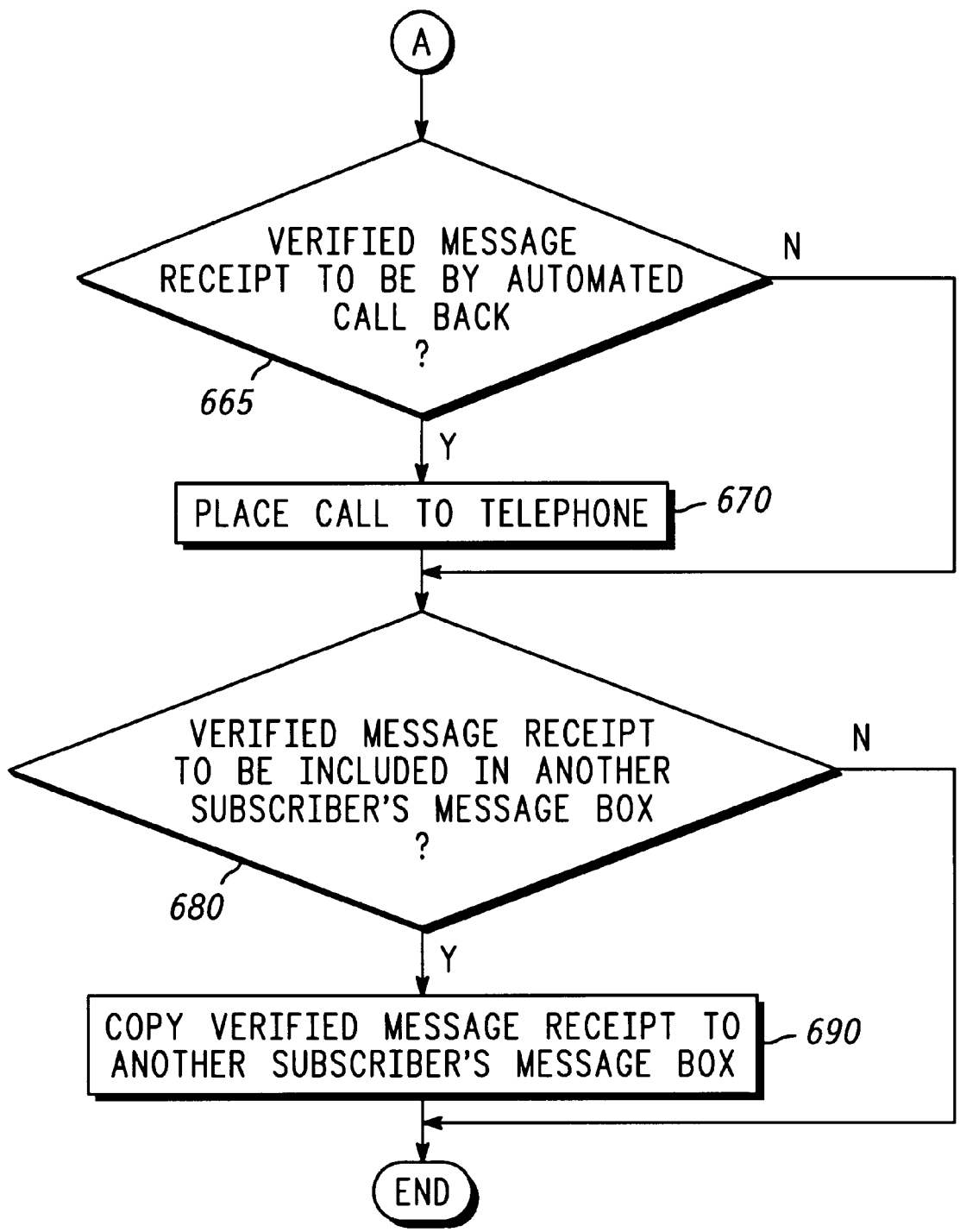
FIG. 8 shows a flow chart for a method of generating a verified message receipt in accordance with a preferred embodiment of the present invention.

After step 630 the message origination and delivery device checks to see if the verified message receipt is to be sent by page in step 640. If a verified message receipt is not to be delivered by page, as evidenced by the lack of a non-surveillance or surveillance user page number, then processing proceeds to step 665 (FIG. 8). If, on the other hand, verified message receipt is to be delivered by page, processing proceeds to step 650. In step 650 the MODD determines whether all or a portion of the message contents, or the message ID are to be included in the verified message receipt. If all or a portion of the message is to be included, then processing continues with step 652, where message contents are copied to the page interface. If the message ID is to be included in the verified message receipt, then processing continues with step 655 where the message ID is copied to the page interface. Then, after either step 652 or step 655, processing proceeds to step 660 where the verified message receipt is sent to the page number.

FIG. 8 shows a flowchart for a method of generating a verified message receipt in accordance with a preferred embodiment of the present invention. The method of FIG. 8 is a continuation of method 600 as described with respect to FIG. 7 above.

In step 665 the MODD determines whether or not the verified message receipt is to be by automated call back. If so, then processing proceeds to step 670 where the call is placed. As in the case of the receipts delivered by page and fax, the voice call back receipt may contain the actual message content and/or a message ID. Otherwise processing skips step 670 and proceeds to step 680. In step 680, the MODD determines whether or not the verified message receipt is to be included in another subscriber's message box, such as the message box of another subscriber or surveillance user. If so, then processing proceeds to step 690 where the message is copied to another subscriber's message box or boxes. If not, or if step 690 has been executed, method 600 ends.

In summary, the method and apparatus of the present invention provides an advantageous verified message receipt feature in a messaging system. Private users are accommodated by the feature, as are surveillance users. Verified message receipts are generated as a result of a messaging system subscriber retrieving a message. Verified message receipts are sent by a variety of means, including pages, faxes, and automated telephone callbacks. The verified message receipts can include all or part of the original message, a message identifier field, the identity of the subscriber, and the time that the message was retrieved.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An apparatus for providing verified message receipt comprising:
    a message storage device for storing messages for a plurality of message system subscribers;
    a communications network interface for receiving said messages to be stored in said message storage device;
    interfaces for notifying users when said messages are retrieved by said plurality of message system subscribers;
    a plurality of message boxes, and wherein at least one of said plurality of message boxes is associated with each of said plurality of message system subscribers; and
    each of said at least one of said plurality of message boxes comprises a surveillance flag.

2. The apparatus of claim 1 wherein said users that are notified are originators of said messages.

3. The apparatus of claim 2 wherein said messages each have a message receipt flag associated therewith and said interfaces for notifying notify when said message receipt flag is raised.

4. The apparatus of claim 1 wherein said users that are notified are not originators of said messages.

5. The apparatus of claim 4 wherein said interfaces for notifying comprise a fax interface for sending a fax when said surveillance flag is raised.

6. The apparatus of claim 5 wherein said interfaces for notifying comprise a paging interface for sending a page when said surveillance flag is raised.

7. The apparatus of claim 6 wherein said interfaces for notifying comprise a communications network interface for placing a telephone call when said surveillance flag is raised.

8. The apparatus of claim 1 wherein there is further included a central message box for storing said received messages for access by a third party.

9. A method of operating an message origination and delivery device, said method comprising the steps of:
    accepting a request for surveillance from a third party;
    receiving a message from a user, wherein said message is intended for a subscriber of a messaging service, and said message is deposited into a message box assigned to said subscriber; and
    notifying said third party when said subscriber retrieves said message from said message box, wherein said step of notifying includes notifying said third party of a message identifier and a time of retrieval.

10. The method of claim 9 wherein said accepting step comprises the step of accepting a pager number from said third party.

11. The method of claim 10 wherein said message box has a surveillance flag associated therewith, and said accepting step further comprises the step of raising said surveillance flag.

12. The method of claim 11 wherein said notifying step comprises the step of when said surveillance flag is raised, sending a page to said pager number.

13. The method of claim 9 wherein said accepting step comprises the step of accepting a telephone number from said third party.

14. The method of claim 13 wherein said message box has a surveillance flag associated therewith, and said accepting step further comprises the step of raising said surveillance flag.

15. The method of claim 14 wherein said notifying step comprises the step of when said surveillance flag is raised, sending an automated callback to said telephone number.

16. The method of claim 9 wherein said accepting step comprises the step of accepting a fax number from said third party.

17. The method of claim 16 wherein said message box has a surveillance flag associated therewith, and said accepting step further comprises the step of raising said surveillance flag.

18. The method of claim 17 wherein said notifying step comprises the step of when said surveillance flag is raised, sending a fax to said fax number.

19. The method as claimed in claim 9 wherein there is further included the step of copying each received message to a central message box for access by said third party.

* * * * *